April 30, 1940.    F. S. LA SOTA    2,199,076
SHAFT AND SOCKET CONNECTION
Filed Aug. 25, 1937
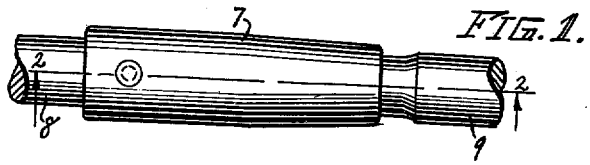
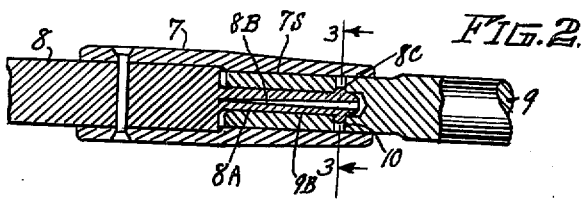
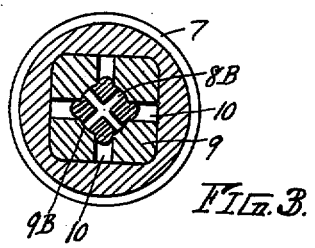
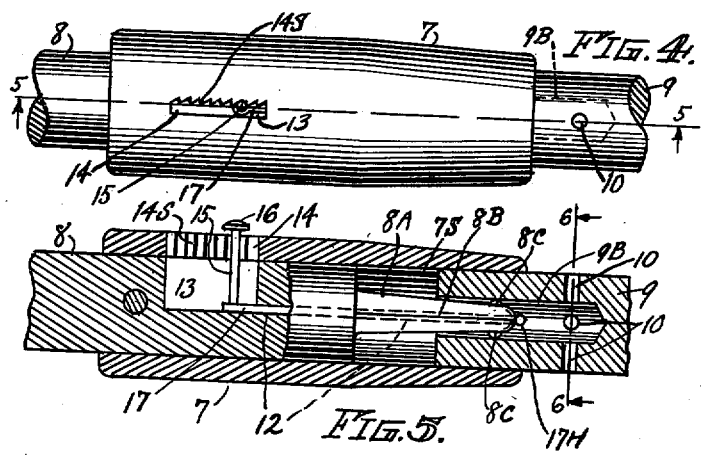
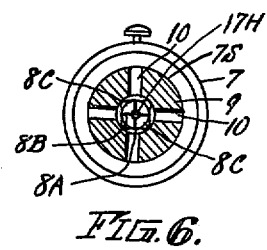
INVENTOR:
Frank S. La Sota
BY David E. Carlsen
ATTORNEY.

Patented Apr. 30, 1940

2,199,076

UNITED STATES PATENT OFFICE 2,199,076

SHAFT AND SOCKET CONNECTION

Frank S. La Sota, St. Paul, Minn.

Application August 25, 1937, Serial No. 160,848

1 Claim. (Cl. 287—124)

My invention relates to shaft sockets in general and more particularly to shaft connections in which a rotary implement is connected with a drive shaft. This device is particularly adaptable for use in socketing and holding one end of a tool such as a drill, an egg-beater, food mixer, portable emery wheel, dental discs, etc.

The main object is to provide a simple, highly efficient and inexpensive shaft connection of the class described.

It is well known in the mechanical field, where implements of various kinds are removably connected to a drive shaft (portable or stationary) such implement may come loose and cause damage or delay and it is one object of my invention to overcome this condition by the simple and effective means hereinafter fully set forth and illustrated in the accompanying drawing, in which, Fig. 1 is a side elevation of my improved shaft connection, showing only a portion of the shank of a rotary implement and a portion of a shaft.

Fig. 2 is a longitudinal section as on line 2—2 of Fig. 1.

Fig. 3 is an enlarged transverse section as on line 3—3 in Fig. 2.

Fig. 4 is an enlarged side elevation corresponding to Fig. 1 and embodying certain modifications in structure.

Fig. 5 is a longitudinal, diametrical section as on line 5—5 in Fig. 4, the shank of the implement shown partly retracted from its socket.

Fig. 6 is a transverse section on line 6—6 of Fig. 5.

Referring to the drawing by reference numerals, like characters designate corresponding parts in the various views.

7 is a tubular, main body member which may also be termed a sleeve within one end of which may be fixedly secured a drive or power shaft 8 extending preferably about half way into the bore of the said sleeve and leaving the other half of the bore open and comprising a socket for insertion of an implement shank 9, the latter of course slidably removable from the socket designated 7S.

The features of my invention lie in the sleeve 7, the construction of the covered end part of shaft 8 within socket 7S and a certain construction of the insertible end of shank 9 as will now be described.

8A is a central forwardly directed prong, integral of shaft 8 and tapering towards its free end, the said end rounded as shown. Said prong is slitted as 8B throughout its entire length preferably 2 crossed slits dividing the prong into 4 parts or arms, the slits tapering inwardly to the base of the prong. Adjacent the rounded free end of prong 8A it is formed with 4 circularly spaced outwardly projecting humps or knobs 8C one on each of the 4 parts of the prong. Normally the prong 8A is or may be of uniform diameter throughout its entire length. The insertible end of shaft 9 is bored, as 9B, the same diameter as the prong plus necessary clearance for sliding fit.

Near the inner terminus of bore 9B shaft 9 is drilled diametrically providing 4 equally spaced bores 10 opening into bore 9B, the inner parts of said bore 10 arranged to be frictionally engaged by the knobs 8C of the prong.

It will now be readily understood that shank 9 is pushed into socket 7S engaging the rounded end of prong 8A and causing the said four arms of the prong to be gathered or closed as the shank 9 is pushed further into the socket.

When shank 9 is thus pushed "home" or as far as it should go into the socket the knobs 8C come into the plane of the bores 10 and automatically the prong members will snap outwardly radially to simultaneously seat all four knobs 8C in the respective bores 10 (see Fig. 2).

The four point frictional and outward seating of the knobs 8C provides a shaft holding medium holding the shaft 9 firmly but the latter can be removed by exerting extra longitudinal pull on the shank 9.

The construction thus far described is for small rotary tools and in which the outwardly sprung arms of the prong have sufficent strength to hold the part 9 for normal use. A non-rotating hand hold of any suitable type, mounted on and about shaft 8 (not shown) may be used and as well known in the art.

In the construction shown in Figs. 5 and 6 additional means are involved for forcibly spreading the prong 8A into locking contact within the bore of shank 9. Said means consist of the provision of a small bore 12 central of the prong 8A and extending into the shaft 8 and into a longitudinal slot 13 in said shaft. 14 is a corresponding slot in casing 7 and may be serrated at one side, as 14S. 17 is a bar reciprocable in bore 12 and its front end having a suitable enlargement 17H at its end adjacent the end of the prong 8A, its other end carrying rigidly an upright shaft or arm 15 in slot 13 with a button head 16 exteriorly of the sleeve 7. The operator pushes button 16 rearwardly (after shank 9 is locked) which pulls the head 17H into the inwardly tapering slits 8B and thus forcibly spreading the prong in a wedge action.

Arm 15 ratchets and can be locked in any tooth of the rack 14S. Other equivalent wedging means may be used, for example, rod 12 may be a flexible member of wire extending to the exterior of member 7 for manipulation.

Obviously the head 17H of the rod 17 acts as a wedge when adjusted and moved into the prong spreading the arm members uniformly and simultaneously the knobs 8C are most firmly held and keyed to the shank 9.

In Figs. 1, 2 and 3 the insertible end of shank 9 is shown to be square, the open end of the sleeve 7 of corresponding shape. Said parts may of course be hexagonal, octagonal or of other polygonal form.

In Figs. 5 and 6 the retained end of shank 9 is shown round. In this construction the prong 8A transmits all the power and rotation to the shank 9 whereas in the former type the shank 9 is positively seated in the sleeve and driven by it, the prong serving solely as a means for preventing accidental movement or displacement of the shank 9. Obviously, the prong construction is not limited to four arms, but may be only two arms or any other number, as desired, and the number of knobs or locking projections 8C according to the number of apertures 10.

In the polygonal socket type of my device (Figs. 1-3 incl.) it is obvious that the key-knobs 8C are automatically alined with their respective engaging parts 10 and snap into place when the members are assembled as described. In the type shown with round shank, as in Figs. 4-6 inclusive, the prong 8A is engaged by the slidably insertible tool shank 9 and after the latter is inserted as far as it will go it is twisted around until the key members 8C snap into their respective sockets simultaneously.

The size of the shank bore 9B correspond to the size of prong 8A it being understood that the outside diameter of the prong (not including the projections 8B) is, when free, uniform to the tip and the outside diameter of said prongs or projections 8B is the same diameter when the arms of the prong are pressed together while inserting the shank. In other words the entire length of the prong fits snugly within the bore of the shank when the projections 8B fit into their respective pockets (see Fig. 2).

Other details of construction may be embodied without departing from the scope and spirit of my invention as herein described and from the following claim.

I claim:

In a coupling for removably connecting a drive shaft and the shank of a rotary tool, a drive shaft with a reduced end of predetermined length and diameter and comprising a concentric extension prong, said prong rounded at its end and adjacent said end formed with a number of radial projections, said prong slitted longitudinally to form a number of forwardly tapering fingers, said shank of the tool provided with a bore to slidably engage the said prong and said shank further provided with a number of radial bores extending into its main bore and the inner parts thereof forming seats for the said radial projections when the driven shaft is moved upon the prong to a certain seating position, and means in the drive shaft for forcibly spreading and holding the prong in the seated position, said means comprising the provision of a longitudinal bore central of the prong and extending into the adjacent part of the drive shaft, a wire or the like in said bore and provided with an enlargement at the end of the prong, said wire accessible at the surface of the drive shaft to reciprocate the wire and move the said enlarged part correspondingly in the prong to successively spread and release the arms of the prong, as shown and described.

FRANK S. LA SOTA.